Figure 1:
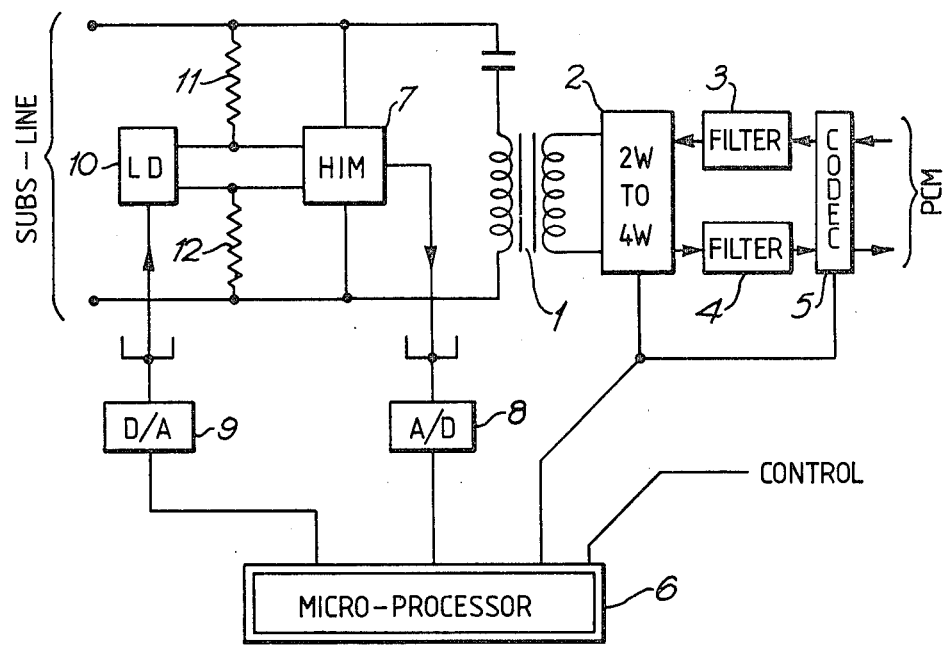

United States Patent [19]

Sweet

[11] 4,345,115

[45] Aug. 17, 1982

[54] TELEPHONE LINE INTERFACE

[75] Inventor: Anthony W. Sweet, Saffron Walden, England

[73] Assignee: Standard Telephones and Cables Limited, London, England

[21] Appl. No.: 214,326

[22] Filed: Dec. 8, 1980

[30] Foreign Application Priority Data

Dec. 13, 1979 [GB] United Kingdom ................. 7943074

[51] Int. Cl.$^3$ ..................... H04M 1/00; H04Q 11/04; H04B 3/36
[52] U.S. Cl. ............................. 179/18 FA; 179/16 F; 179/81 R
[58] Field of Search .............. 179/18 F, 18 FA, 16 F, 179/81 R, 70, 77, 170 R, 170 G

[56] References Cited
U.S. PATENT DOCUMENTS 4,261,051 4/1981 Ohnishi et al. .................... 179/16 F
4,268,723 5/1981 Taylor ................................ 179/16 F Primary Examiner—Thomas A. Robinson
Attorney, Agent, or Firm—James B. Raden; Marvin B. Chaban

[57] ABSTRACT

A telephone subscriber's line interface for a system in which the telephone instrument and the connections therefrom to the exchange use analogue, while the exchange is digital is described, in which electro-mechanical components are eliminated.

To achieve this a microprocessor serves a group of lines on a multiplexed basis, responding to conditions of the line as determined via a high impedance monitor and analogue-to-digital conversion means. It also responds to control inputs from the rest of the exchange. In response to the above inputs it controls line feed, signalling, etc. via digital-to-analogue conversion means and a line driver.

2 Claims, 2 Drawing Figures

TELEPHONE LINE INTERFACE

This invention relates to a telephone subscriber's line interface for a system in which the telephone instrument and the connections therefrom use analogue techniques while the exchange uses digital techniques such as pulse code modulation (PCM).

Such an interface has to work directly with a conventional telephone line, and hence with conventional 10 impulses per second subscriber loop signalling or voice frequency signalling. It has to handle analogue speech transmission and to provide the high level of ringing signal needed to operate the subset bell. Thus the functions to be provided are battery feed, over-voltage protection, ringing current supply, supervision, hybrid (i.e. 2wire-4wire conversion) and transmission.

The interface has to have a good degree of longitudinal rejection because there is almost always a significant level of longitudinal 50 (or 60) Hz noise present on the line. On hook/off hook supervision has to operate satisfactorily in the face of such longitudinal interference, and the circuit must be accurately balanced about earth so that the subscriber does not hear the mains hum. Over voltage protection has to deal with both transient and permanent fault conditions. The worst transient conditions are induced lightning surges of up to 1.5 kV and short duration longitudinal transients having a voltage of 650 V r.m.s. The lightning surges are normally specified as having a 10 $\mu$s rise time on 800 $\mu$s fall time to half peak value, while the 650 volt longitudinal disturbance is specified as lasting for 11 cycles at 50 or 60 Hz.

Permanent fault conditions can include a short circuit to earth on either wire, or a short circuit to battery, but the worst fault condition is a mains cross in which it is assumed that the full 220 volts r.m.s. is connected to the line. Ideally the interface should be able to withstand all of these transient and permanent fault conditions without damage, but it is generally accepted that for the mains cross a component may be used to fuse the line but there should not be excessive dissipation in the line circuit. Transients must be withstood and the line interface must recover to normal operation thereafter.

An object of the invention is to produce a line interface which satisfies most at least of the above requirements, and in which the use of electromechanical components is in the main eliminated.

According to the present invention there is provided a telephone subscriber's line interface for a system in which the telephone instruments and the connections therefrom to the exchange use analogue techniques while the exchange uses digital techniques such as pulse code modulation (PCM), in which the line is coupled via a two-wire to four-wire conversion circuit to separate GO and RETURN channels, in which the GO channel is coupled from the conversion circuit to analogue to digital conversion means which produces the digital output for use in the exchange, in which the RETURN channel is coupled from digital-to-analogue conversion means which re-creates speech for transmission to the subscriber's line and said two-wire-to-four-wire conversion current, in which a monitoring circuit having a high impedance is connected to the line so as to monitor the line current and/or line voltage, in which the output of the monitoring circuit is coupled via further analog-to-digital conversion means to a micro-processor to perform required operations in respect of the subscriber's line under control of the output of the monitoring circuit and of a control connection from within the exchange, and in which the output of the microprocessor via which various signalling and other conditions are applied to the line is coupled to said line via further digital-to-analogue conversion means and a line driver circuit.

Two embodiments of the invention will now be described with reference to the accompanying FIGS. 1 and 2.

In the arrangement of FIG. 1, speech transmission is handled in a relatively conventional way with an isolation transformer 1, an active anaglogue two-wire to 4-wire conversion circuit (i.e. electronic hybrid) 2, filters 3,4 made in LSI and codecs 5. All of these, except the transformer, use semiconductor techniques, preferably LSI.

The battery feed, ringing and line supervision are handled in a novel manner, based on the concept of a universal line driver which can generate any required potential or signal for delivery to line. To achieve this a microprocessor 6 is used, which is coupled to the line via a high impedance monitor 7 and an analogue-to-digital converter 8. The monitor is high impedance so that its shunt impedance is high for speech. The microprocessor is also coupled to the line via a digital-to-analogue converter 9 and a line driver 10, which applies power and signals to the line via two small series-connected resistors 11, 12. The conditions across these resistors are also monitored by the monitor 7.

The converters 8, 9 are realised with minimal hardware, and they incorporate multiplexing and demultiplexing facilities so that one microprocessor can serve a number, e.g. 4, 8 or 16, of line interfaces. Note that the microprocessor 6, which also has a control connection to the rest of the exchange, also controls the powering down of the speech transmission codec chip set during the idle phase of the line circuit operation.

The above functions are readily available: thus there are currently available single-chip microprocessors which include an analogue-to-digital converter of sufficient resolution for line signalling. Also available is a single chip analogue multiplexer which multiplexes sixteen analogue inputs into an on-chip analogue-to-digital converter, so the realisation of such a design is economical.

Further evolution of an arrangement such as that of FIG. 1 would enable the interface to deal with speech, which would minimise the hardware. Further, the analogue-to-digital and digital-to-analogue conversion function performed in the concept of FIG. 1 could be performed by a configuration such as that of FIG. 2, which is also transformerless. This assumes that all line circuit functions, including 2-wire to 4-wire conversion and its converse, digital filtering and digital control use digital control techniques. Hence a microprocessor would probably be too slow for handling the digital speech functions, so the use of some highspeed digital technology is implied, e.g. VLSI.

Figure 2:
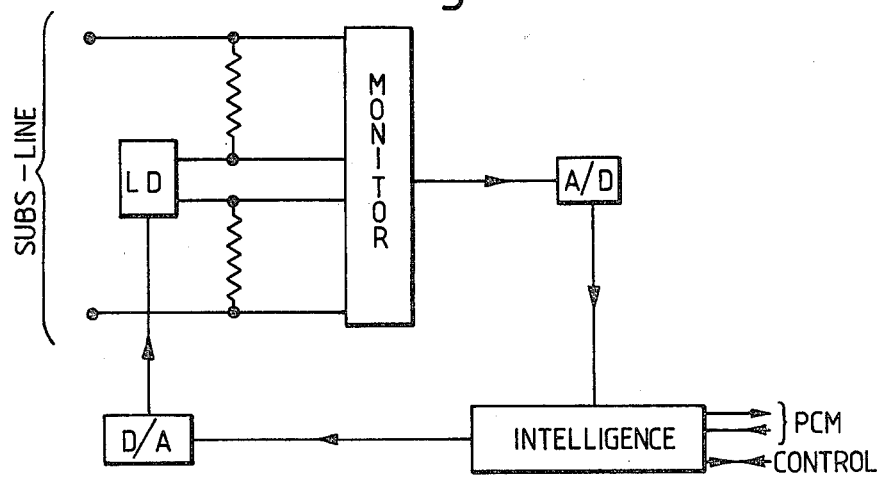

Neither FIG. 1 nor FIG. 2 show components for secondary protection, which could be provided if needed.

I claim:

1. A telephone subscriber's line interface for a system in which the telephone instruments and the connections therefrom to the exchange use analogue techniques while the exchange uses digital techniques such as pulse code modulation, in which the line is coupled to an analog network in said interface and via a two-wire to four-wire conversion circuit to separate GO and RETURN channels, in which the GO channel is coupled from the conversion circuit to analogue-to-digital conversion means which produces the digital output for use in the exchange, in which the RETURN channel is coupled from digital-to-analogue conversion means which re-creates speech for transmission to the subscriber's lines and said two-wire to four-wire conversion circuit, the invention in which said analog network includes a monitoring circuit having a high impendance connected to and individual to one of said analogue lines so as to monitor the line current and/or line voltage, means for coupling the output of the monitoring circuit via further analogue-to-digital conversion means to the input of a microprocessor common to a plurality of line interfaces to react to monitored line change conditions at said plurality of line interfaces under control of the output of the respective monitoring circuits and under a control connection from within the exchange, and further means for coupling the output of the microprocessor via which various signalling and other conditions applied to the line are coupled to said line via further digital-to-analogue conversion means and via a line driver circuit within said analog network.

2. An interface as claimed in claim 1, and in which the further digital-to-analogue conversion means and the further analogue-to-digital conversion means are implemented by a single reversible device.

* * * * *